United States Patent
Sabini et al.

(10) Patent No.: US 12,333,792 B2
(45) Date of Patent: Jun. 17, 2025

(54) GUIDED WORKFLOW FOR DEEP LEARNING ERROR ANALYSIS

(71) Applicant: LandingAI Inc., Palo Alto, CA (US)

(72) Inventors: Mark William Sabini, River Edge, NJ (US); Kai Yang, Fremont, CA (US); Andrew Yan-Tak Ng, Camas, WA (US); Daniel Bibireata, Bellevue, WA (US); Dillon Laird, Santa Monica, CA (US); Whitney Blodgett, San Francisco, CA (US); Yan Liu, Dalian (CN); Yazhou Cao, San Carlos, CA (US); Yuxiang Zhang, Shanghai (CN); Gregory Diamos, Menlo Park, CA (US); YuQing Zhou, Palo Alto, CA (US); Sanjay Boddhu, Aurora, IL (US); Quinn Killough, Sonoma, CA (US); Shankaranand Jagadeesan, San Jose, CA (US); Camilo Zapata, Bogota (CO); Sebastian Rodriguez, Medellin (CO)

(73) Assignee: LandingAI Inc., Palo Alto, CA (US)

( * ) Notice: Subject to any disclaimer, the term of this patent is extended or adjusted under 35 U.S.C. 154(b) by 260 days.

(21) Appl. No.: 17/971,063

(22) Filed: Oct. 21, 2022

(65) Prior Publication Data
US 2023/0136672 A1 May 4, 2023

Related U.S. Application Data

(60) Provisional application No. 63/273,830, filed on Oct. 29, 2021.

(51) Int. Cl.
*G06V 10/776* (2022.01)
*G06V 10/25* (2022.01)
*G06V 10/778* (2022.01)

(52) U.S. Cl.
CPC ............ *G06V 10/776* (2022.01); *G06V 10/25* (2022.01); *G06V 10/7788* (2022.01)

(58) Field of Classification Search
CPC .. G06V 10/776; G06V 10/25; G06V 10/7788; G06V 10/774; G06V 10/7784; G06V 10/82; G06V 10/945; G06V 10/764
See application file for complete search history.

(56) References Cited

U.S. PATENT DOCUMENTS

| | | | |
|---|---|---|---|
| 2016/0283708 A1* | 9/2016 | Getchius | G06F 21/36 |
| 2019/0073447 A1* | 3/2019 | Guo | G06V 10/7784 |

(Continued)

*Primary Examiner* — Amandeep Saini
*Assistant Examiner* — Andrew S Budisalich
(74) *Attorney, Agent, or Firm* — Fenwick & West LLP

(57) ABSTRACT

A model management system performs error analysis on results predicted by a machine learning model. The model management system identifies an incorrectly classified image outputted from a machine learning model and identifies using the Neural Template Matching (NTM) algorithm, an additional image correlated to the selected image. The system outputs correlated images based on a given image and a selection by a user through a user interface of a region of interest (ROI) of the given image. The region is defined by a bounding polygon input and the correlated images include features correlated to the features within the ROI. The system prompts a task associated with the additional image. The system receives a response that includes an indication that the additional image is incorrectly labeled and including a replacement label and instruct that the machine learning model be retrained using an updated training dataset that includes the replacement label.

20 Claims, 13 Drawing Sheets

(56) References Cited

U.S. PATENT DOCUMENTS

| | | | |
|---|---|---|---|
| 2020/0250397 A1* | 8/2020 | Ghafurian | G01N 33/483 |
| 2020/0372072 A1* | 11/2020 | Braun | G06F 17/18 |
| 2021/0042797 A1* | 2/2021 | Shamiss | G06Q 30/0278 |
| 2021/0097337 A1 | 4/2021 | Wang et al. | |
| 2022/0005218 A1* | 1/2022 | Robinson | G06Q 30/0631 |
| 2022/0067405 A1* | 3/2022 | Kim | G06V 10/82 |
| 2022/0350999 A1* | 11/2022 | Nguyen | G06F 18/253 |
| 2023/0059857 A1* | 2/2023 | Dolby | G06F 11/0793 |
| 2023/0142401 A1* | 5/2023 | Brook | G07C 5/0808 |
| | | | 706/12 |
| 2024/0331375 A1* | 10/2024 | Kanaujia | G06V 10/82 |

\* cited by examiner

Choose an error type to fix:

| Error Type | Count | |
|---|---|---|
| Missed Discoloration | 27 | Fix |
| Missed Crack | 10 | Fix |
| Predicted Crack instead of Discoloration | 5 | Fix |
| Predicted an extra Crack | 1 | Fix |
| Predicted an extra Discoloration | 1 | Fix |

FIG. 3

Error type: Missed Discoloration

| Ground Truth 410 | Prediction 420 | Loss 430 | Actions 440 |
|---|---|---|---|
| 411 | 421 | 0.54 | Fix |
| 412 | 422 | 0.24 | Fix |
| 413 | 423 | 0.10 | Fix |

FIG. 4

Actions Taken

Add examples of Discoloration:

1. Media 1. jpg
2. Media 2. jpg
3. Media 3. jpg

Finish

FIG. 11

Bucket: Discoloration False Negatives

| Ground Truth | Prediction | Loss | Actions |
|---|---|---|---|
| 1210 | | 0.54 | Add 3 examples of Discoloration to training set. |
| 1220 | | 0.24 | Fix |
| 1230 | | 0.10 | Fix |

FIG. 12

GUIDED WORKFLOW FOR DEEP LEARNING ERROR ANALYSIS

CROSS-REFERENCE TO RELATED APPLICATIONS

This application claims the benefit of U.S. Provisional Application No. 63/273,830, filed Oct. 29, 2021, which is incorporated by reference herein in its entirety.

TECHNICAL FIELD

This disclosure relates generally to deep learning models, and more particularly to error analysis of deep learning models.

BACKGROUND

A visual inspection platform may enable users to develop computer vision solutions end-to-end using machine learning models. A common task for the visual inspection platform is error analysis, in which users examine errors made by a model in order to determine next actions to improve performance. Currently, only experienced machine learning engineers may be able to carry out sophisticated error analysis because outputs from the machine learning models contain technical information about errors and mapping these errors to next actions requires technical knowledge and training. This poses a problem for nontechnical users, who are reliant on experienced machine learning engineers to carry out error analysis and determine effective actions to fix the errors. Additionally, naive attempts equally bias whole images in order to detect conditions, which may further lead to inaccuracies and inefficiencies. For example, noise in an image being equally biased with the same weight as a condition leads to models that are inaccurate in ascertaining that condition. Moreover, applying equal processing power to all pixels of an image results in an inefficient mechanism for detecting conditions that may appear in only a small subset of those pixels.

SUMMARY

Systems and methods are disclosed herein for a guided workflow system that improves machine learning model performance by streamlining the error analysis process. Further details are described below and in the attached slide deck.

The guided workflow system may identify an incorrectly classified image outputted from a machine learning model. Using a neural template matching module that deploys the Neural Template Matching (NTM) algorithm, the guided workflow system may identify an additional image that is correlated to the selected image. The guided workflow system may output correlated images based on a given image and a selection by a user through a user interface of a region of interest (ROI) of the given image. The region may be defined by a bounding polygon input by the user, and the correlated images include features correlated to the features within the ROI in the given image. The guided workflow system may prompt, through the user interface, a task associated with the additional image. The guided workflow system may receive a response for the task from the user, through the user interface. The response may include an indication that the additional image is incorrectly labeled and including a replacement label.

The disclosed systems and methods may provide several technical advantages. The guided workflow system allows non-technical users to improve the performance of a machine learning model in a self-service manner through a series of guided tasks. The guided workflow system does so by distilling heuristics and best practices from machine learning engineers and programmatically implementing them. To automate certain tasks, the guided workflow system may also introduce and deploy a similarity search algorithm, sometimes referred to herein as Neural Template Matching (NTM), which is well-suited for images with small-scale features, such as manufacturing defects. The end result is a guided workflow for fixing model errors in which the user may need to answer a series of simple questions that requires concrete action items, therefore enabling non-technical users to improve the performance of a machine learning model. Furthermore, the disclosed systems and methods achieve higher accuracies and efficiency by utilizing the NTM algorithm, which finds images with similar (regions of interest) ROI and focuses the search on a particular area on the image, therefore achieving higher efficiency and accuracy.

Any figures and description relate to preferred embodiments by way of illustration only. It should be noted that from the following discussion, alternative embodiments of the structures and methods disclosed herein will be readily recognized as viable alternatives that may be employed without departing from the principles of what is claimed.

BRIEF DESCRIPTION OF THE DRAWINGS

FIG. 3 depicts illustrates an exemplary grouping of model errors, in accordance with one embodiment.

FIG. 4 illustrates an exemplary user interface for ranking incorrectly classified images and for further pinning down an incorrectly classified image to fix, in accordance with one embodiment.

FIG. 11 illustrates an example user interface for the user to confirm adding the additional images to the training dataset, in accordance with one embodiment.

FIG. 12 illustrates an example user interface that provides the user with options to further fix other images, in accordance with one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Overview

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is disclosed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Figure 1:
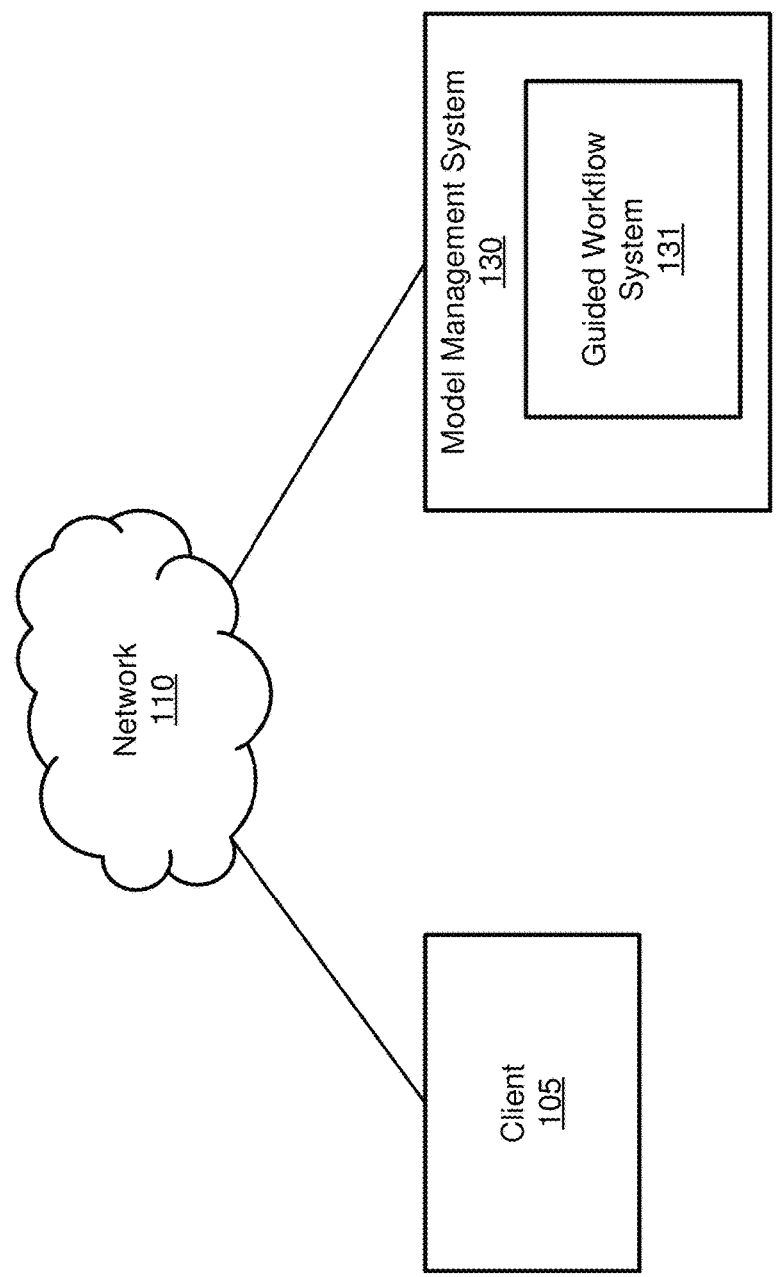
FIG. 1 depicts an exemplary system environment for a model management system including a guided workflow system, in accordance with one embodiment.

FIG. 1 is a high-level block diagram of a system environment for a model management system that includes a guided workflow system, in accordance with an embodiment. The system environment 100 shown by FIG. 1 includes one or more clients 105, a network 110, and the model management system 130 with and guided workflow system 131. In alternative configurations, different and/or additional components may be included in the system environment 100.

The network 110 represents the communication pathways between the client 105 and model management system 130. In one embodiment, the network 110 is the Internet. The network 110 can also utilize dedicated or private communications links that are not necessarily part of the Internet. In one embodiment, the network 110 uses standard communications technologies and/or protocols. Thus, the network 110 can include links using technologies such as Ethernet, Wi-Fi (802.11), integrated services digital network (ISDN), digital subscriber line (DSL), asynchronous transfer mode (ATM), etc. Similarly, the networking protocols used on the network 110 can include multiprotocol label switching (MPLS), the transmission control protocol/Internet protocol (TCP/IP), the hypertext transport protocol (HTTP), the simple mail transfer protocol (SMTP), the file transfer protocol (FTP), etc. In one embodiment, at least some of the links use mobile networking technologies, including general packet radio service (GPRS), enhanced data GSM environment (EDGE), long term evolution (LTE), code division multiple access 2000 (CDMA2000), and/or wide-band CDMA (WCDMA). The data exchanged over the network 110 can be represented using technologies and/or formats including the hypertext markup language (HTML), the extensible markup language (XML), the wireless access protocol (WAP), the short message service (SMS) etc. In addition, all or some of the links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

The client 105 may include one or more computing devices that display information to users, communicate user actions, transmit, and receive data from the model management system 130 through the network 110. While one client 105 is illustrated in FIG. 1, in practice many clients 105 may communicate with the model management system 130 in the environment 100. In one embodiment, client 105 may be operated in connection with a service provided by the model management system 130 for visual inspection. For example, client 105 may be operated by a representative of a manufacturing entity, a quality assurance entity, or any other entity interested in visual inspection such as marker detection. The term marker typically refers to a defect in a manufactured product but may refer to any significant marking on an object. Notwithstanding the breadth of the disclosure extending to any marker, the term defect is used interchangeably with the term marker throughout this disclosure for conciseness and clarity.

The client 105 may receive software services by using software tools provided by the model management system 130 for visual inspection. The tools may be software applications or browser applications that enable interactions between the client 105 and the model management system 130 via the network 110. The client 105 may access the software tool through a browser or may download the software tool through a third-party app platform, such as an app store. In one embodiment, the client 105 interacts with the network 110 through an application programming interface (API). In one embodiment, the tools may receive inputs from the client 105 which are further used by the guided workflow system 131 to conduct error analysis and update the training dataset. The software tools may include an interface through which the client 105 may be provided with a series of guided tasks for error analysis.

The model management system 130 may manage and provide an end-to-end service for training a machine learning model for visual inspection such as detecting markers. The term marker typically refers to a defect in a manufactured product but may refer to any significant marking on an object, the significance being defined by a guidance provided by the client and explained by labeled training data. For example, a blemish on a steel bolt may be marked by a machine learning model as a blemish, whereas a stripped threading on the steel bolt may be marked by the machine learning model as a defect, where defects lead to a discarding of the bolt, and blemishes lead to another outcome (e.g., painting before distribution).

The model management system 130 may include a guided workflow system 131 for analyzing predicted results and identifying causes for inaccurate predictions. The guided workflow system 131 may provide a series of guided tasks through the client device 105. The guided workflow system 131 may use the feedback gathered from the series of guided tasks to analyze one or more causes for inaccurate predictions. Further details with regard to the guided workflow system 131 is illustrated in FIG. 2.

Figure 2:
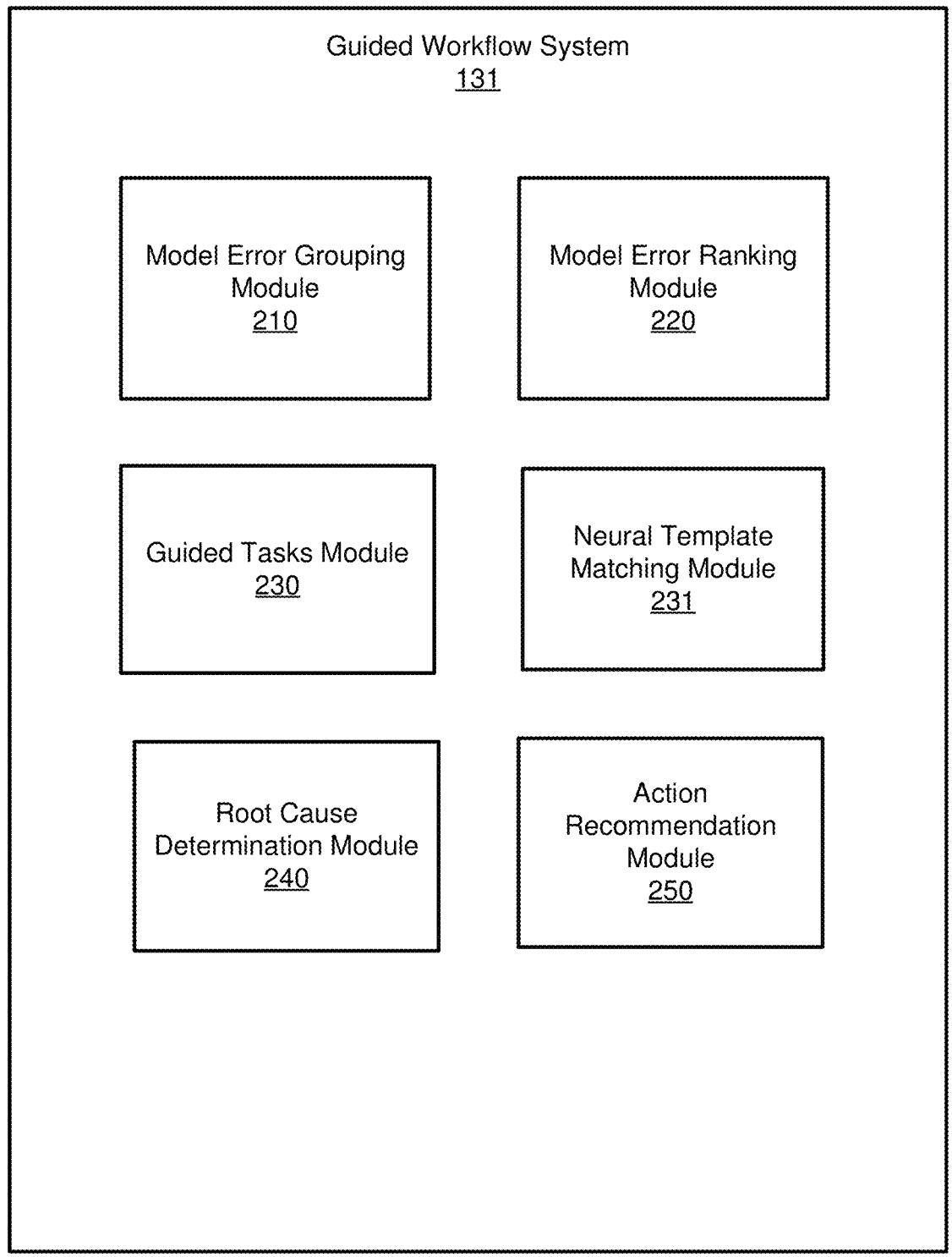
FIG. 2 depicts exemplary modules of a guided workflow system, in accordance with one embodiment.

FIG. 2 depicts exemplary modules of a guided workflow system, in accordance with one embodiment. The guided workflow system 131 may include a model error grouping module 210 that performs grouping of model errors, a model error ranking module 220 that ranks model errors based on a number of inaccurate predictions due to each error, a guided task module 230 that generates and presents a series of tasks for a user, a neural template matching module 231 that identifies additional training data samples similar to the identified image, a root cause determination module 240 that determines one or more root causes for model errors, and an action recommendation module 250 that recommends actions for improving model results based on the identified causes.

The model error grouping module 210 classifies model errors based on error types. The model error grouping module 210 automatically groups model errors into high-level buckets based on the error types. In one embodiment, the grouping is based on error types such as false negative, false positive, etc. The model error grouping module 210 may further include additional categories. As an example specific to a cell phone (e.g., the example of FIG. 4), these additional categories may include missed discoloration, missed crack, predicted crack instead of discoloration, predicted an extra crack, predicted an extra discoloration, blurry images, poor lighting, defects in corner, lighting color, illumination, point of focus, etc. Other domains would have corresponding categories (e.g., for food inspection, a category could be "missed a blemish". In one embodiment, the model error grouping module 210 groups the errors using clustering algorithm. For example, the incorrectly classified images may be clustered using a clustering algorithm and each cluster may correspond to one category of errors. In another embodiment, the grouping is achieved through manual grouping by a human classifier. The model error grouping module 210 may further display a count of misclassified datapoints for each error type, and rank the errors based on the counts. In some embodiments, the model error grouping module 210 may display a number of top ranked error types to the user for further analysis. An illustration of grouping of model errors is depicted in FIG. 3.

FIG. 3 illustrates an example user interface for grouping of model errors by the model error grouping module. In FIG. 3, the errors are grouped into multiple categories, or error types 311, ordered based on number of occurrences 312 (e.g., as performed by model error grouping module 210). FIG. 3 illustrates five categories including missed discoloration, missed crack, predicted crack instead of discoloration, predicted an extra crack, predicted an extra discoloration, but additional groupings of other error types are also possible. Examples of other error groupings include but are not limited to, blurry images, defects in corner, lighting color, illumination, point of focus, etc. A user may interact with the platform and use buttons 310 to select a category of errors for a more detailed analysis.

Continuing with the discussion of FIG. 2, the model error ranking module 220 may rank the incorrectly classified images based on a score associated with each incorrectly classified image. Within each error type, the model error ranking module 220 utilizes scoring functions to rank individual errors, thus aiding the user in error triage. In some embodiments, a score may be a loss associated with the predictions. Each image classified incorrectly may incur a loss to the model based on a loss function used by the model in prediction. The model error ranking module 220 may rank the incorrectly classified images based on the loss (or other functions based on the loss) and present a number of top-ranking data points to the user for further analysis. The user may select further actions for each incorrect prediction. An illustration of ranking of misclassified images for an error type is depicted in FIG. 4.

FIG. 4 illustrates an exemplary user interface for ranking incorrectly classified images and for further pinning down an incorrectly classified image to fix. In FIG. 4, multiple images 411, 412, and 413 are ordered in descending order based on prediction loss 430. The user interface may include a column of ground truth 410 images that are labeled with identified discoloration areas. The user interface may further include a column of prediction results 420 that depict predicted results 421, 422, and 423, for which the model fails to correctly identify the discoloration areas. The user may further select a specific image for further error analysis through actions 440. For example, the user may select a specific image for fixing the missed discoloration error. In response to detecting that an error is selected for fixing, the guided tasks module 230 may prompt the user through a series of simple tasks to further analyzing the causes, which is discussed in greater detail in accordance with the guided tasks module 230.

Figure 5:
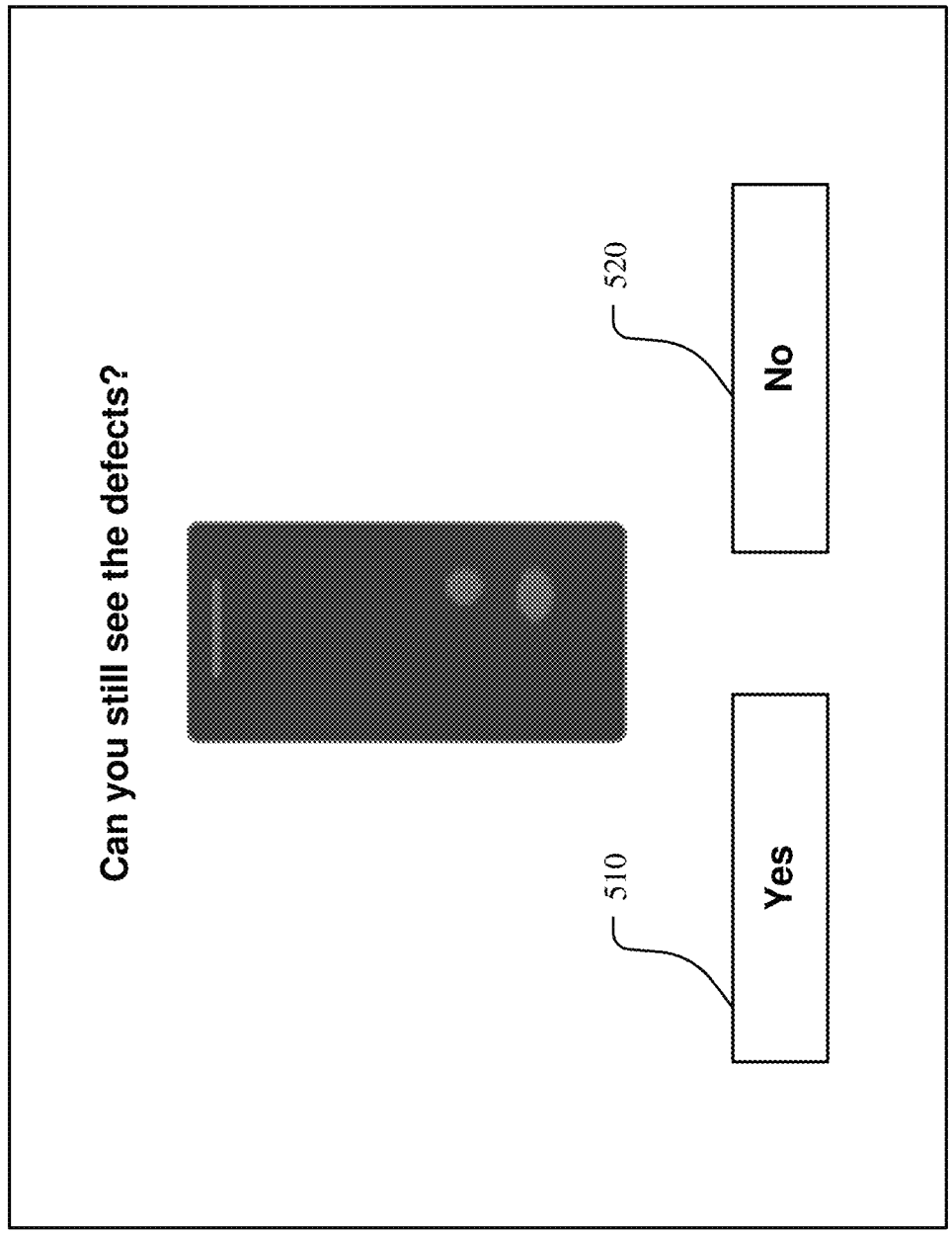
FIG. 5 illustrates an exemplary task for the user where the image is processed, in accordance with one embodiment

Referring back to FIG. 2, the guided tasks module 230 may walk the user through a series of simple tasks to ascertain the root cause of the error. In one embodiment, the tasks may include (but are not limited to): scrutinizing a single image, relabeling images, choosing images from a list, comparing two images, distinguishing between visually similar defects. The guided tasks module 230 may dynamically process the user's response to rule out or confirm root causes and determine the next task for the user. FIG. 5 illustrates an example of a task prompted to the user.

For example, as illustrated in FIG. 5, the guided tasks module 230 may present an image to the user and prompt the user to indicate whether the defects are still visible after processing. In one embodiment, FIG. 5 illustrates an exemplary task for the user where the image is downscaled (e.g., decreasing the pixel number), and the guided tasks module 230 asks whether the user can still see the defects. The user may reply by selecting one of the buttons 510 or 520.

Figure 6:
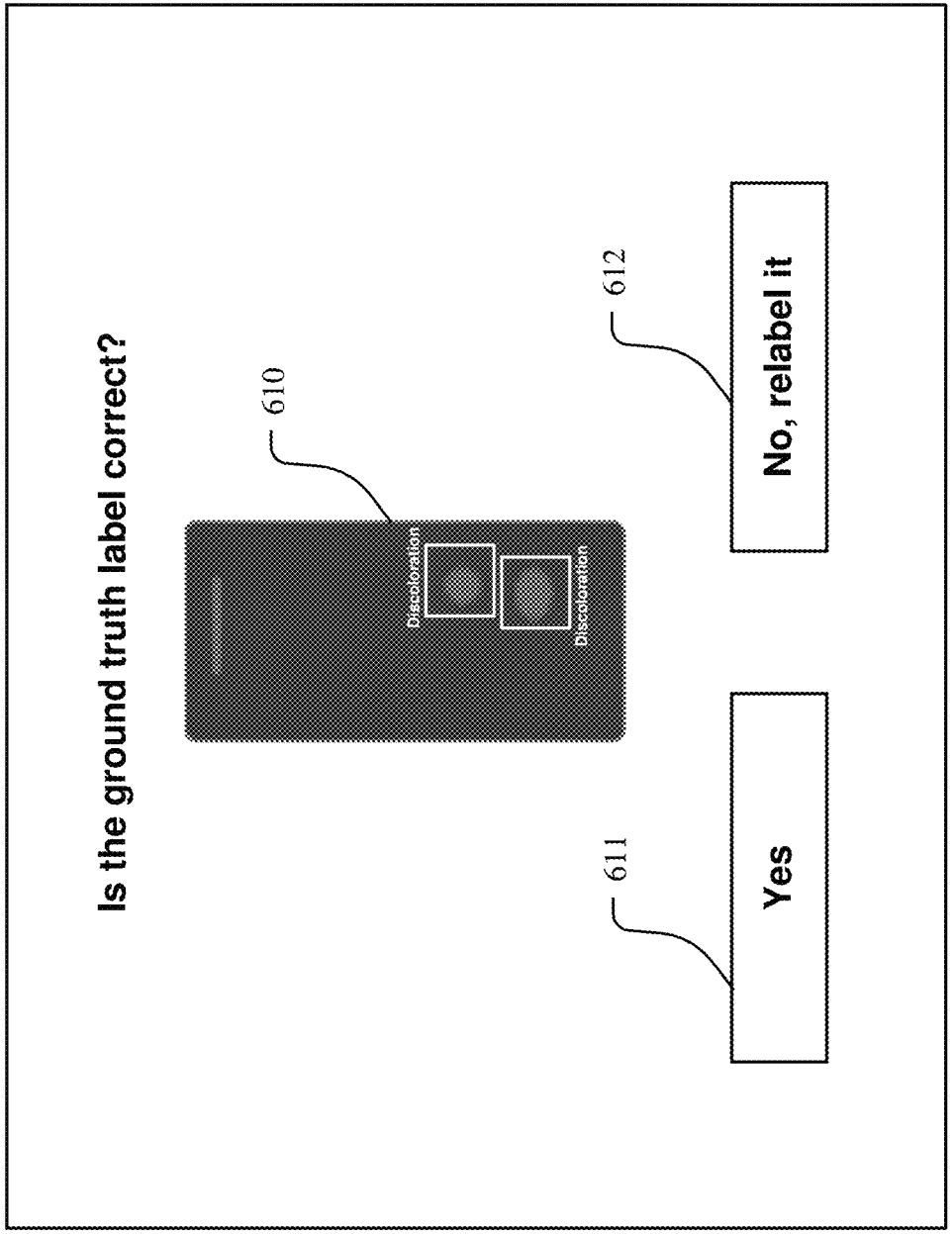
FIG. 6 illustrates a task prompted to the user for ascertain image labeling with the user, in accordance with one embodiment.

As an additional example, FIG. 6 illustrates another task prompted to the user by the guided tasks module 230. The guided tasks module 230 may ascertain image labeling 610 with the user. The guided tasks module 230 may display an image and asks the user to indicate whether the label is correct. In FIG. 6, the guided tasks module 230 may display a mobile phone and two areas identified as discoloration. The guided tasks module 230 may further provide the user with two buttons 611 and 612 for the user to provide feedback.

In one embodiment, the guided tasks module 230 may determine the sequence of tasks for the user is determined based on received user response. That is, each user response for a previous task may affect how the guided workflow system prompts subsequent tasks for the user. The guided tasks module 230 may use heuristic methods to determine the series of tasks based on user responses. In one embodiment, an expert in the field may predetermine a series of rules and tasks for the user to finish. The guided tasks module 230 may prompt the tasks to the user based on the predetermined rules and user responses.

Figure 7:
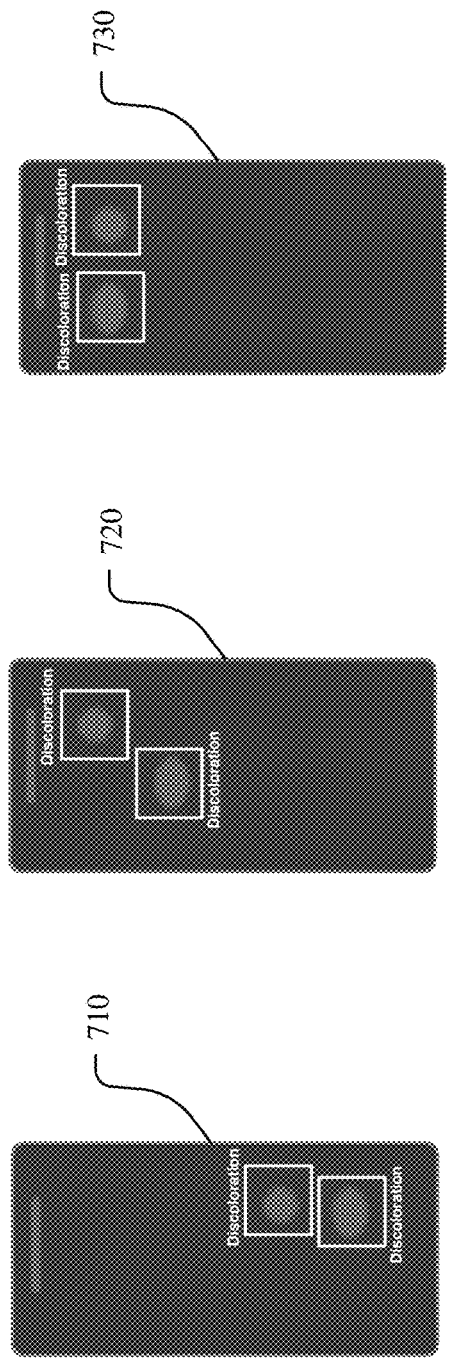
FIG. 7 illustrates an example user interface that shows multiple similar images identified by the neural template matching module, in accordance with one embodiment.
Figure 9:
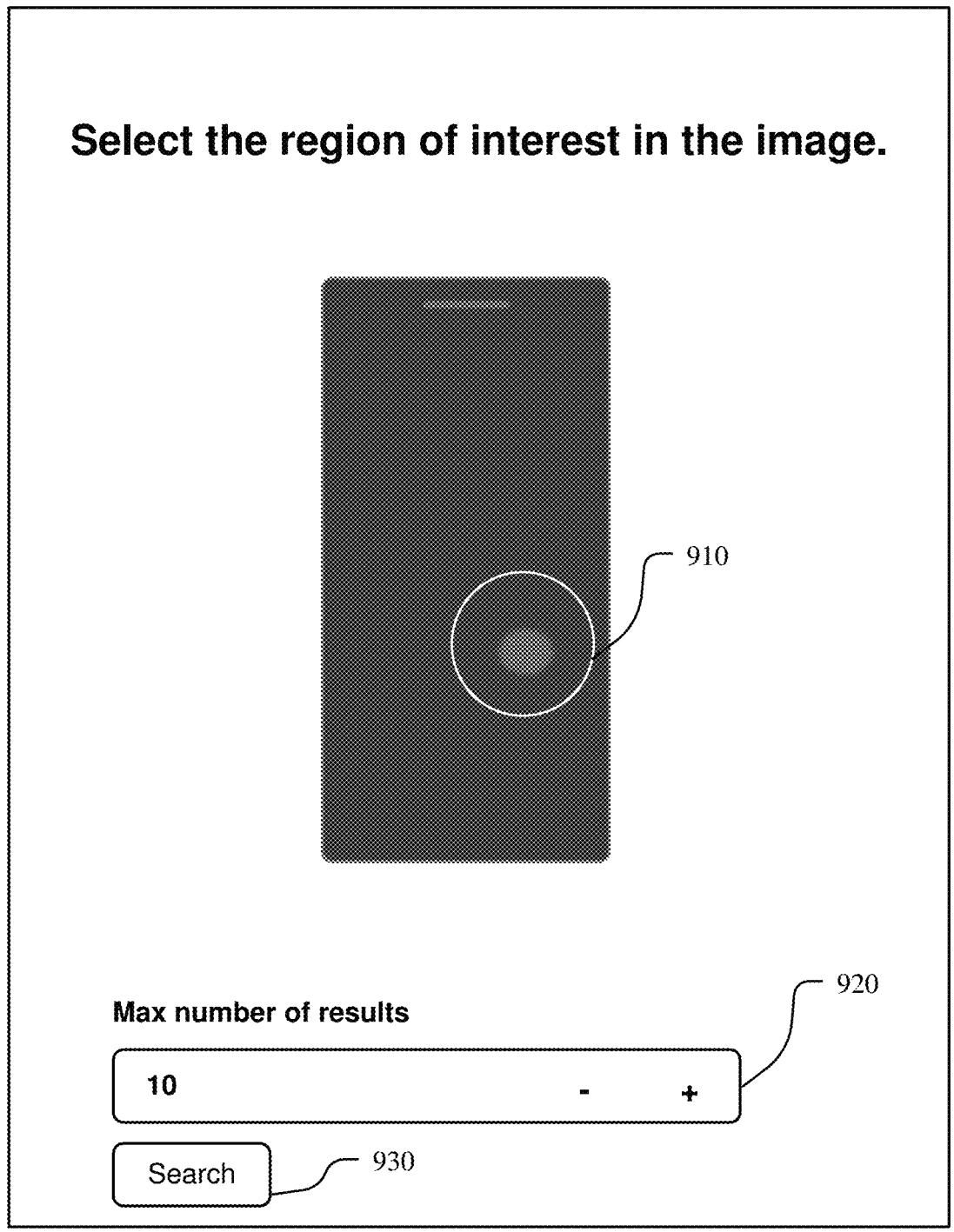
FIG. 9 illustrates an example user interface where a user may identify a region of interest in a query image through a neural template matching module, in accordance with one embodiment.

Referring back to FIG. 2, using the neural template matching module 231, the guided tasks module 230 may generate additional tasks for the user. The guided tasks module 230 may generate sample data points from training data or unlabeled data that are similar to the identified data point. To identify similar data, the guided tasks module 230 may leverage neural network-based image similarity search. The neural template matching module 231 may use an algorithm called Neural Template Matching (NTM) to conduct image similarity search focused on a specific region of the image. The neural template matching module 231 may utilize a neural network to retrieve results tuned to a specific dataset. The neural template matching module 231 may use a feature-based approaching for training the neural network. The neural template matching module 231 may use neural networks, such as a convolutional neural network to extract image features based on the identified region of interest (ROI). The image features may include shapes, textures, colors, corners, lines, vertices, etc. The neural template matching module 231 may extract the features from each image to match those in the ROI of the target image. The neural template matching module 231 may take a query image and a region of interest (ROI) as input, and outputs correlated images with similar ROI. In one embodiment, the query image and the ROI is identified by the user. The query image may be an image from the plurality of images of the error type that the user selected previously. A sample user interface for the user to identify a region of interest in an image for feeding as input to the neural template matching module 230 is shown in FIG. 9. In one embodiment, the neural template matching module 230 may automatically identify an ROI given an image using a trained machine learning model. Using NTM to identify correlated images enables users to automatically link model errors back to the original training data, and surface similar images in a pool of unlabeled or labeled data. FIG. 7 illustrates an example where the guided tasks module 230 uses the neural template matching module 231 to identify similar images.

FIG. 7 illustrates an example user interface that shows multiple similar images identified by the neural template matching module 231. The neural template matching module 231 may identify, from the training data, images 710, 720 and 730 that are similar to the target image selected in FIG. 4. Images 710, 720, and 730 are labeled images that are used in the training process. The guided tasks module 230 may present the images to the user asks the user to determine if the labels are labeled correctly. If any of the label is inaccurate, the guided tasks module 230 may ask the user to relabel the image in subsequential tasks.

The neural template matching module 231 may also be used by the action recommendation module 250 for refining training data, which is discussed in accordance with the action recommendation module 250 and FIGS. 8-11.

Based on user responses and heuristics, the root cause determination module 240 of the guided workflow system 131 as illustrated in FIG. 2 may determine or ascertain a root cause and recommend concrete actions for the user to fix the errors. In one embodiment, the root cause determination module 240 may ascertain the error type that was determined by the model error grouping module 210. In some embodiments, the root cause determination module 240 may determine a root cause based on heuristics and the responses received from the user. For example, as shown in FIG. 5, if the user indicates that the defect is not visible after processing the image, the root cause determination module 240 may determine that the root cause is model input size and image preprocessing. As another example in FIG. 6, if the user indicates that the ground truth label is incorrect, then the root cause determination module 240 may determine that the root cause is labeling and the action recommendation module 250 may suggest relabeling the training images. As another example, the root cause determination module 240 may determine from user responses that the target image and similar training images have different labels but the same error type, and the root cause determination module 240 may determine that the defect book or labeling guide needs to be updated. As another example, the root cause determination module 240 may determine that insufficient amount of training data points is associated with the error type of the target image, and the action recommendation module 250 may find similar unlabeled images and suggests adding the images to the training data. The action recommendation module 250 is further discussed below.

Figure 8:
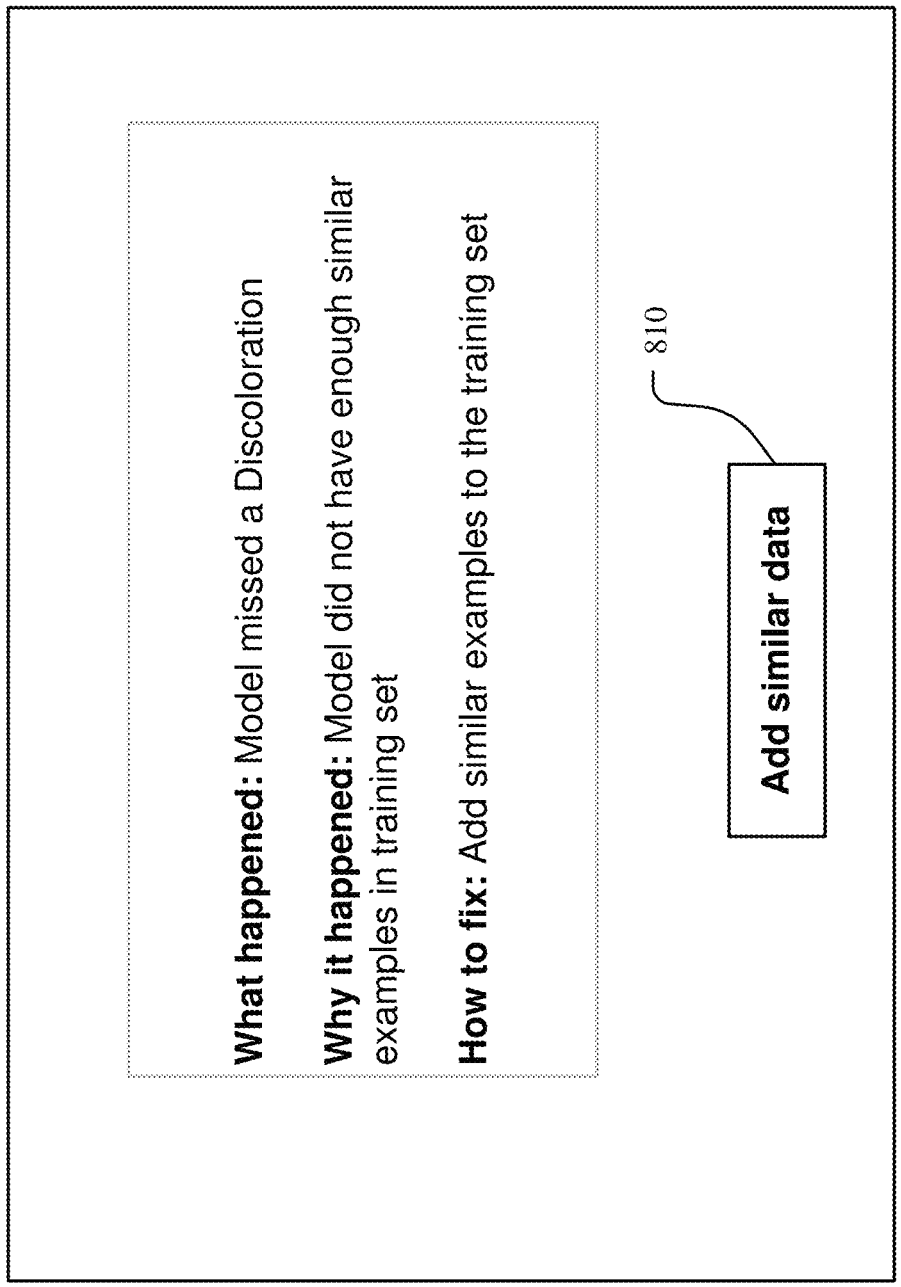
FIG. 8 illustrates an exemplary user interface for presenting a root cause based on user responses, in accordance with one embodiment.

After the root cause is determined, the action recommendation module 250 may map the root cause to one or more concrete actions, which are then assigned to the user to execute. These actions include (but are not limited to): fixing image labels, updating a labeling convention, adding similar data for training, changing model hyperparameters, modifying data augmentation, updating the defect book. For example, FIG. 8 illustrates an example user interface for presenting a root cause and associated recommended actions. The user interface illustrated in FIG. 8 may present a summary of the observed poor model behavior, a root cause indicating why the error happened, and a concrete action to fix the error. The user may click on button 810 to perform the suggested action, for example as illustrated in FIG. 8, to add similar data to the training dataset. Responsive to the user selecting adding more similar data to the training dataset, the neural template matching module 231 may guide the user through a series of tasks for identifying similar images to the training data, which is further illustrated in accordance with FIGS. 9, 10 and 11.

FIG. 9 illustrates an example user interface where a user may identify a region of interest 910 in a query image through a neural template matching module 231. In one embodiment, the neural template matching module 231 may prompt the user to specify x and y position of the region of interest. In alternative embodiments, the neural template matching module 231 may ask the user to click or circle the region of interest 910, tap on a touch screen, draw a polygon on screen, to identify the region of interest 910. In some embodiments, the neural template matching module 231 may ask the user to input a defined space to focus on in any known manner. The user interface illustrated in FIG. 9 may also include an input field 920 where the user may enter a maximum number of similar images to return. The user may click on search 930 when the region of interest and the desired number of results are entered. To further aid the user, the neural template matching module returns images ranked in decreasing order of similarity to the user-provided query.

The neural template matching module 231 may identify correlated images from unlabeled data using the NTM algorithm. Based on the correlated images, the neural template matching module 231 may generate additional actionable items. The neural template matching module 231 may present the correlated images to the user for confirming labeling. For example, in a correlated image presented to the user, a crack may be incorrectly labeled as discoloration.

Figure 10:
FIG. 10 illustrates a user interface that presents group of correlated images to the user, in accordance with one embodiment.

In one embodiment, the neural template matching module 231 may present several correlated images for the user to confirm and select correlated images. For example, as illustrated in FIG. 10, the neural template matching module 231 may present through the user interface, a group of correlated images 1010, 1020, 1030, 1040, 1050, and 1060 identified by the NTM algorithm. The user may select one or more images that are similar to the example image 1070 on the left. In one embodiment, the user can select the ones that have the same label (i.e., same type of error) as the label of the target image. The correlated images are identified using the NTM algorithm and the selected images may be added to the training data with the user-selected labels as ground truth labels. The confirmed images may be added to the training dataset as illustrated in FIG. 11.

FIG. 11 illustrates an example user interface for the user to confirm adding the additional images to the training dataset. In FIG. 11, the user interface may present the names, and the number of images to be added to the training data set. The user interface may also show the type of the examples (e.g., discoloration, cracks, etc.) Responsive to the user confirming (e.g., clicking on "Finish") the action to be performed (e.g., adding additional images), the guided workflow system 131 may take the user to the interface illustrated in FIG. 12.

FIG. 12 depicts an example user interface after finishing the analysis for one incorrectly predicted image. The user interface illustrated in FIG. 12 shows the target image 1210 that has been analyzed. The user interface may provide the user with further options to further fix other images such as 1220 and 1230.

Figure 13:
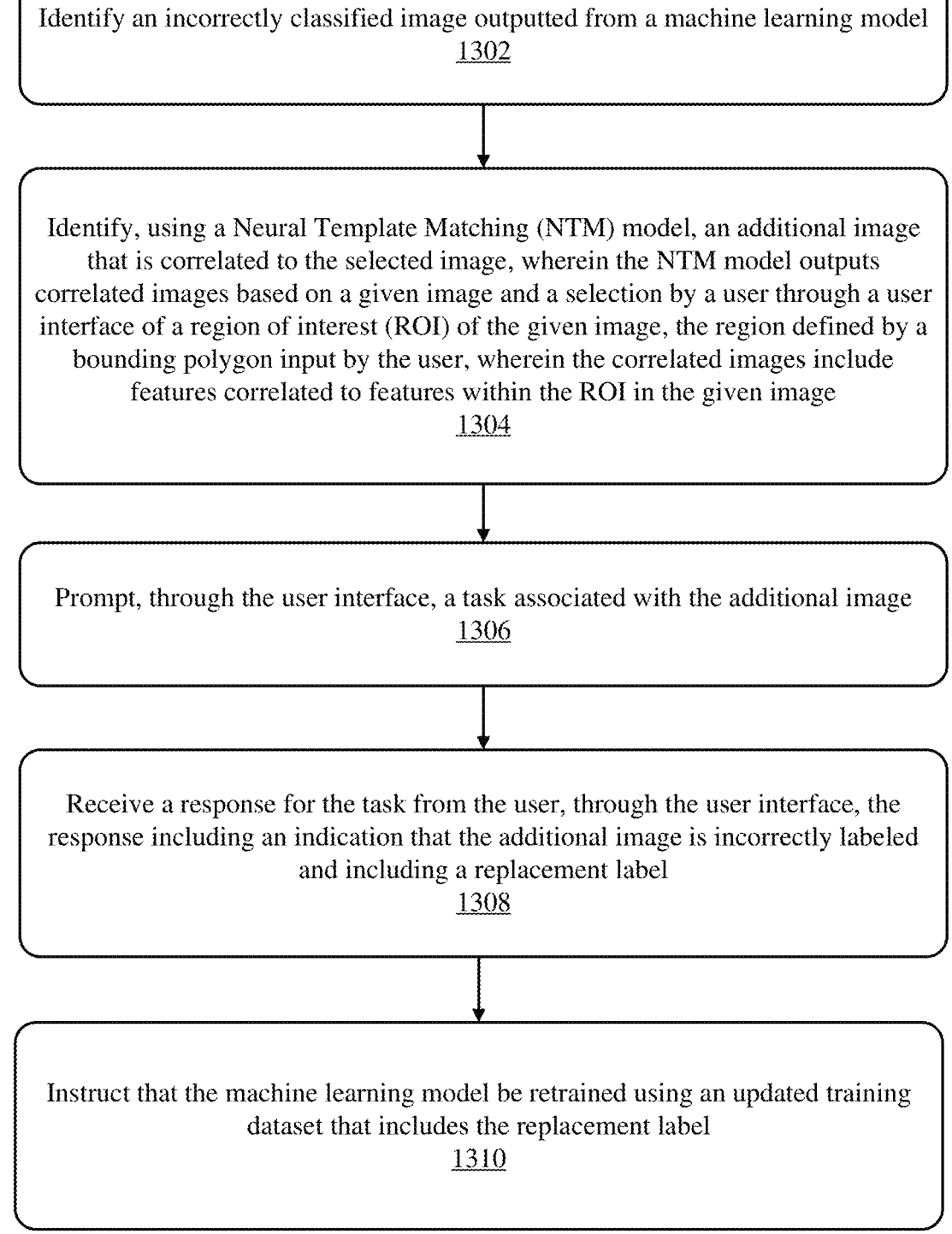
FIG. 13 illustrates an example process for performing error analysis on results predicted by a machine learning model, in accordance with one embodiment.

FIG. 13 illustrates an example process for performing error analysis on results predicted by a machine learning model. The process 1300 may start with the model error grouping module 210 and the model error ranking module 220 identifying 1302 an incorrectly classified image outputted from a machine learning model. The guided tasks module 230 may identify 1304, using the neural template matching module 231 that deploys the Neural Template Matching (NTM) algorithm, an additional image that is correlated to the selected image. The neural template matching module 231 may output correlated images based on a given image by automatically determining the relevant region of interest (ROI) of the given image, or by selection by a user through a user interface of a region of interest (ROI) of the given image (e.g., the region may be defined by a bounding polygon input by the user). The correlated images include features correlated to the features within the ROI in the given image. The guided tasks module 230 may prompt 1306, through the user interface, a task associated with the additional image. The guided tasks module 230 may receive a response for the task from the user, through the user interface, the response including an indication that the additional image is incorrectly labeled and including a replacement label. The model management system 130 may instruct 1310 that the machine learning model be retrained using an updated training dataset that includes the replacement label.

ADDITIONAL CONFIGURATION CONSIDERATIONS

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for improving data collection for a model performing sub-optimally through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. A method comprising:
 identifying an incorrectly classified image outputted from a machine learning model;
 identifying, using a Neural Template Matching (NTM) model, an additional image that is correlated to the incorrectly classified image, wherein the NTM model outputs correlated images based on a given image and a selection by a user through a user interface of a region of interest (ROI) of the given image, the region defined by a bounding polygon input by the user, wherein the correlated images include features correlated to features within the ROI in the given image;
 prompting, through the user interface, a task associated with the additional image;
 receiving a response for the task from the user, through the user interface, the response including an indication that the additional image is incorrectly labeled and including a replacement label;

prompting, through the user interface, a second task to select an error type for further investigation from a presented group of error types, wherein the group of error types to present is selected based on a ranking of loss associated with each error type, the error type associated with a category of incorrectly classified images; and instructing that the machine learning model be retrained using an updated training dataset that includes the replacement label.

2. The method of claim 1, further comprising:
identifying a set of incorrectly classified images including the incorrectly classified image; and
classifying each of the set of incorrectly classified images into a category of a set of pre-determined categories based on an error type.

3. The method of claim 2, wherein the task further comprises:
presenting the correlated image including the additional image to the user; and
presenting a message to the user to choose one or more images from the correlated images, wherein the one or more images are grouped incorrectly with the error type.

4. The method of claim 3, wherein the one or more images chosen from the correlated images are chosen to be added to a training dataset; and wherein the method further comprises
instructing that the machine learning model be retrained with the training dataset.

5. The method of claim 2, further comprising:
determining a score, for each incorrectly classified image in a group of incorrectly classified images of a same category; and
determining a ranking of the incorrectly classified images in the group based on the score.

6. The method of claim 5, wherein the score is determined based on a loss function used in the machine learning model.

7. The method of claim 1, further comprising:
responsive to detecting a selection of the error type, prompting, through the user interface, a plurality of additional tasks associated with the category of incorrectly classified images, each additional task being a concrete action for a user to perform for fixing the error type.

8. The method of claim 7, wherein the plurality of additional tasks includes one or more of: presenting an image for the user to examine, presenting images to the user for relabeling, presenting a plurality of images for the user to choose from, or presenting two or more images for the user to compare.

9. The method of claim 7, further comprising:
determining a root cause based on responses received to the plurality of additional tasks for the type of error; and
providing, through the user interface, an action that addresses the root cause of the type or error.

10. The method of claim 9, wherein the action is one or more of: fixing image labels, updating a labeling convention, adding additional data for training, changing model hyperparameters, modifying data augmentation.

11. The method of claim 1, wherein a type of error is one of: missed discoloration, missed crack, predicted crack instead of discoloration, predicted an extra crack, predicted an extra discoloration.

12. A non-transitory computer-readable storage medium storing executable computer instructions that, when executed by one or more processors, cause the one or more processors to perform operations, the instructions comprising instructions to:
identify an incorrectly classified image outputted from a machine learning model;
identify, using a Neural Template Matching (NTM) model, an additional image that is correlated to the incorrectly classified image, wherein the NTM model outputs correlated images based on a given image and a selection by a user through a user interface of a region of interest (ROI) of the given image, the region defined by a bounding polygon input by the user, wherein the correlated images include features correlated to features within the ROI in the given image;
prompt, through the user interface, a task associated with the additional image;
receive a response for the task from the user, through the user interface, the response including an indication that the additional image is incorrectly labeled and including a replacement label;
prompt, through the user interface, a second task to select an error type for further investigation from a presented group of error types, wherein the group of error types to present is selected based on a ranking of loss associated with each error type, the error type associated with a category of incorrectly classified images; and
instructing that the machine learning model be retrained using an updated training dataset that includes the replacement label.

13. The non-transitory computer-readable storage medium of claim 12, wherein the instructions further comprising instructions to:
identify a set of incorrectly classified images including the incorrectly classified image; and
classify each of the set of incorrectly classified images into a category of a set of pre-determined categories based on an error type.

14. The non-transitory computer-readable storage medium of claim 13, wherein the task further comprises:
presenting the correlated image including the additional image to the user; and
presenting a message to the user to choose one or more images from the correlated images, wherein the one or more images are grouped incorrectly with the error type.

15. The non-transitory computer-readable medium of claim 14, wherein the one or more images chosen from the correlated images are chosen to be added to a training dataset; and wherein the instructions further comprise instructions to:
instructing that the machine learning model be retrained with the training dataset.

16. The non-transitory computer-readable storage medium of claim 13, wherein the instructions further comprise instructions to:
determine a score, for each incorrectly classified image in a group of incorrectly classified images of a same category; and
determine a ranking of the incorrectly classified images in the group based on the score.

17. The non-transitory computer-readable medium of claim 16, wherein the score is determined based on a loss function used in the machine learning model.

18. The non-transitory computer-readable medium of claim 12, the instructions further comprising instructions to:
responsive to detecting a selection of the error type, prompt, through the user interface, a plurality of additional tasks associated with the category of incorrectly classified images, each additional task being a concrete action for a user to perform for fixing the error type.

19. The non-transitory computer-readable medium of claim 18, wherein the plurality of additional tasks includes one or more of: presenting an image for the user to examine, presenting images to the user for relabeling, presenting a plurality of images for the user to choose from, or presenting two or more images for the user to compare.

20. The non-transitory computer-readable medium of claim 18, the instructions further comprising instructions to:
determine a root cause based on responses received to the plurality of additional tasks for the type of error; and
provide, through the user interface, an action that addresses the root cause of the type or error.

* * * * *